United States Patent
Park

(10) Patent No.: US 8,384,357 B2
(45) Date of Patent: Feb. 26, 2013

(54) COMPUTER SYSTEM WITH CHARGING UNIT AND CONTROL METHOD THEREOF

(75) Inventor: Jeong-gyu Park, Gyeonggi-do (KR)

(73) Assignee: Samsung Electronics Co., Ltd., Samsung-ro, Yeongtong-gu, Suwon-si, Gyeonggi-do (KR)

( * ) Notice: Subject to any disclaimer, the term of this patent is extended or adjusted under 35 U.S.C. 154(b) by 314 days.

(21) Appl. No.: 12/789,517

(22) Filed: May 28, 2010

(65) Prior Publication Data

US 2010/0308774 A1 Dec. 9, 2010

(30) Foreign Application Priority Data

Jun. 4, 2009 (KR) .................. 10-2009-0049300

(51) Int. Cl.
*H01M 10/44* (2006.01)
*H01M 10/46* (2006.01)

(52) U.S. Cl. ....................................... 320/150
(58) Field of Classification Search .............. 320/170, 320/112, 114, 150, 153
See application file for complete search history.

(56) References Cited

U.S. PATENT DOCUMENTS

| | | | |
|---|---|---|---|
| 2007/0120535 A1* | 5/2007 | Wallace | 320/134 |
| 2007/0210742 A1* | 9/2007 | Brecht | 320/104 |
| 2008/0136368 A1* | 6/2008 | Hajiaghajhani | 320/106 |
| 2009/0140697 A1* | 6/2009 | Hurley et al. | 320/139 |

* cited by examiner

*Primary Examiner* — Edward Tso
(74) *Attorney, Agent, or Firm* — Cha & Reiter, LLC

(57) ABSTRACT

A computer system include: a system unit; a charging unit which outputs a charging current to a battery unit for supplying electric power to the system unit; and a first temperature compensating unit which selectively adjusts the level of the charging current so that the temperature of the charging unit is substantially maintained within a predetermined range.

33 Claims, 10 Drawing Sheets

COMPUTER SYSTEM WITH CHARGING UNIT AND CONTROL METHOD THEREOF

CLAIM OF PRIORITY

This application claims the benefit of priority from Korean Patent Application No. 10-2009-0049300, filed on Jun. 4, 2009 in the Korean Intellectual Property Office, the disclosure of which is incorporated herein by reference.

BACKGROUND OF INVENTION

1. Field of Invention

The present invention relate to a computer system having a battery unit detachably mounted thereto as an auxiliary power source and a charging unit for charging the battery unit, and a control method thereof.

2. Description of Related Art

In general, a computer system, such as a laptop computer or a mobile computer, may be provided with an adapter unit for supplying electric power to operate and a battery unit as an auxiliary power source.

Such a computer system is provided with a charging unit for charging the battery unit. The charging unit may be provided with a switching part such as an FET (Field Effect Transistor) which is supplied with electric power through the adapter unit and selectively outputs a charging current to the battery unit; and a switching controller which controls the switching part so that the charging current reaches a predetermined target value.

However, when the battery unit is charged, a lot of heat may be generated from the charging unit due to a switching operation of the switching part. As a result, the heat may affect a control operation of the switching controller. In particular, as the switching part is arranged closer to the switching controller, the heat may more significantly affect the control operation of the switching controller, thereby lowering reliability of the control operation of the switching controller. Thus, a life span of the battery unit may be shortened. Also, the design of the charging unit may be restricted.

Further, the heat may be generated from the battery unit as well as the charging unit. This may also affect operations of the computer system, and in a worst scenario, the safety of the computer system may be affected in case of excessive heat.

SUMMARY OF INVENTION

Accordingly, it is an aspect of the present invention to provide a computer system which can guarantee reliability of a charging control against heating of a charging unit when charging of a battery unit or the like, and a control method thereof.

Another aspect of the present invention is to provide a computer system which can guarantee operational reliability and safety of the computer system against the heat exposure from a battery unit as well as a charging unit, and a control method thereof.

Additional aspects of the present invention will be set forth in part in the description which follows and, in part, will be obvious from the description, or may be learned by practice of the present invention.

The foregoing and/or other aspects of the present invention can be achieved by providing a computer system including: a system unit; a charging unit which outputs a charging current to a battery unit for supplying electric power to the system unit; and a first temperature compensating unit which adjusts the level of the charging current so that the temperature of the charging unit is within a predetermined range.

The charging unit may include a switching part which performs switching so that the charging current is outputted to the battery unit; and a switching controller which controls the switching part so that the charging current reaches a predetermined target value, and wherein the temperature of the charging unit may include the temperature of the switching part.

The first temperature compensating unit may include a thermistor which is varied in a resistance value thereof according to the temperature of the switching part, and be connected to a node at which the voltage determines the charging current.

The computer system may further include a second temperature compensating unit which decreases the charging current if temperature of the battery unit is equal to or higher than a first predetermined value.

The second temperature compensating unit may stop the output of the charging current after the charging current is decreased.

The second temperature compensating unit may include a resistor which is connected to the node; a switch which is connected in series with the resistor; and a microprocessor which turns on the switch if the temperature of the battery unit is equal to or higher than the first predetermined value.

The computer system may further include a third temperature compensating unit which decreases power consumption of the system unit if temperature of the battery unit is equal to or higher than a second predetermined value.

The third temperature compensating unit may include a comparator which compares the temperature of the battery unit with the second predetermined value; and an offset setting part which offsets a power management threshold value for the system unit on the basis of the comparison result of the comparator.

The third temperature compensating unit may include a microprocessor which receives a signal indicating the temperature of the battery unit and offsets the power management threshold value for the system unit.

The foregoing and/or other aspects of the present invention can also be achieved by providing a control method of a computer system, including: outputting a charging current to a battery unit for supplying electric power to a system unit; and adjusting the level of the charging current so that the temperature of the charging unit is within a predetermined range.

The outputting may include controlling a switching part which performs switching so that the charging current reaches a predetermined target value, and wherein the temperature of the charging unit may include the temperature of the switching part.

The control method may further include decreasing the discharging current if temperature of the battery unit is equal to or higher than a first predetermined value.

The decreasing may include stopping the output of the discharging current after the decreasing of the discharging current.

The control method may further include decreasing power consumption of the system unit if temperature of the battery unit is equal to or higher than a second predetermined value.

The decreasing may include offsetting a power management threshold value for the system unit if the temperature of the battery unit is equal to or high than the second predetermined value.

According to the present invention, a charging control can be guaranteed against the heat output from the charging unit due to the charging of the battery unit or the like, and thus, a life span of the battery unit can be increased and a design of the charging unit can be simplified.

Further, operational reliability and safety of the computer system can be guaranteed against the heat from the charging unit and the battery unit due to the discharge of the battery unit or the like.

BRIEF DESCRIPTION OF DRAWINGS

The above and/or other aspects of the present invention will become apparent and more readily appreciated to those skilled in the art from the following description of the exemplary embodiments, taken in conjunction with the accompanying drawings, in which.

DETAILED DESCRIPTION OF THE INVENTION

Figure 1:
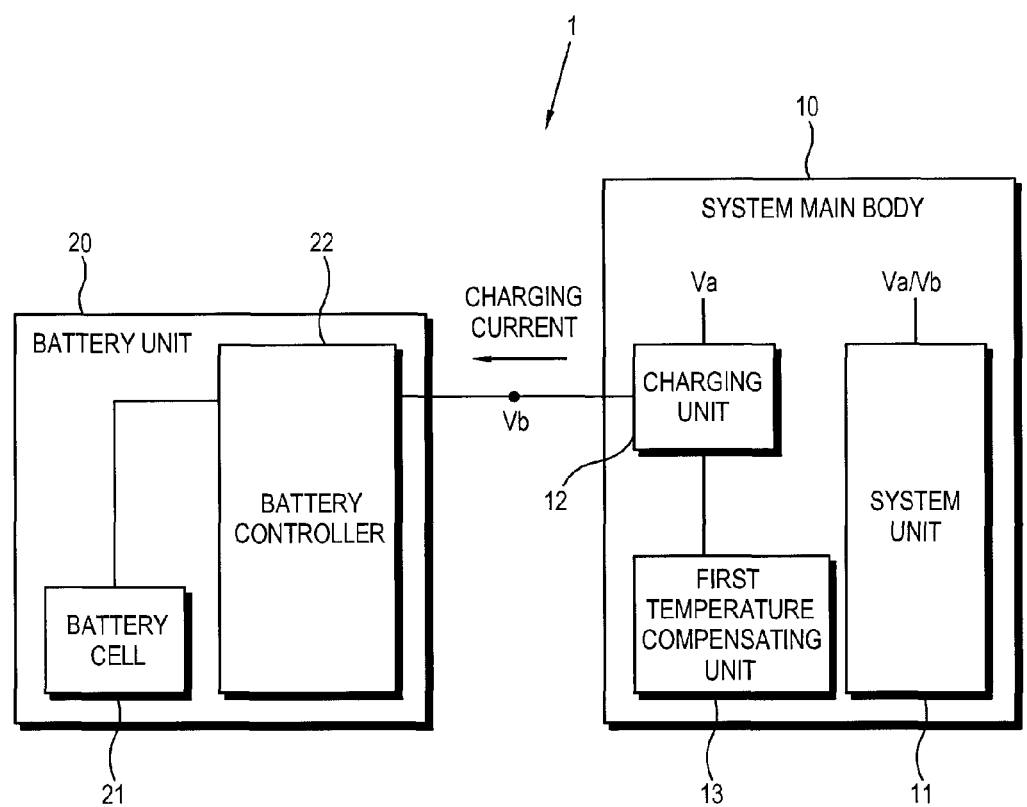
FIG. 1 is a block diagram illustrating a configuration of a computer system according to an exemplary embodiment of the present invention.

Reference will now be made in detail to the embodiments of the present invention, examples of which are illustrated in the accompanying drawings, wherein like reference numerals refer to like elements throughout. The exemplary embodiments are described below so as to explain the present invention by referring to the figures. Redundant description to different embodiments may be omitted for simplicity of description.

FIG. 1 illustrates a configuration of a computer system 1 according to an exemplary embodiment of the present invention. The computer system 1 may be a laptop computer, a mobile computer devices such as a personal digital assistance (PDA), a personal communication assistant (PCA), an electronic organizer, or any duplex interactive devices. As shown in FIG. 1, the computer system 1 may include a system main body 10, and may selectively include a battery unit 20. The system main body includes a system unit 11 which executes computer programs to perform predetermined operations.

Figure 2:
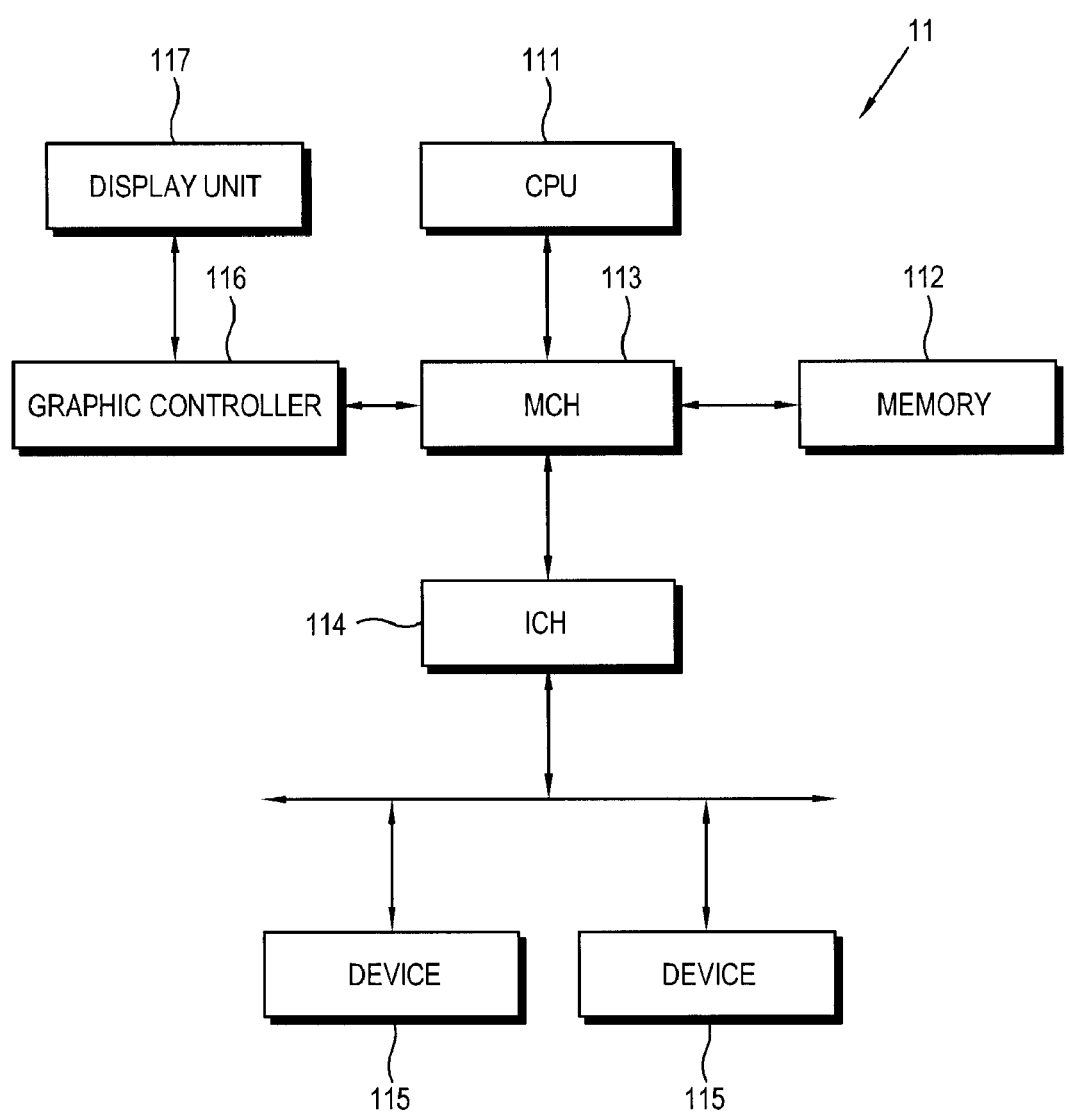
FIG. 2 illustrates a configuration of a system unit according to an exemplary embodiment of the present invention.

FIG. 2 illustrates a configuration of the system unit 11 according to an exemplary embodiment of the present invention. As shown in FIG. 2, the system unit 11 includes a CPU 111, a memory 112, a Memory Controller Hub (MCH) 113, a graphic controller 116, a display unit 117, an I/O Controller Hub (ICH) 114, and a plurality of devices 115.

The CPU 111 controls overall operations of the system unit 11 and executes the computer programs loaded in the memory 112. The CPU 111 may perform communication with the MCH 113, the graphic controller 116, the ICH 114, and the device 115. The CPU 111 may control these components when executing the computer programs.

The memory 112 stores therein the computer programs to be executed by the CPU 111 and data necessary for performing operations of the CPU 111. The memory 112 may be provided as a volatile memory such as a Double-Data-Rate Synchronous Dynamic Random Access Memory (DDR SDRAM).

The graphic controller 116 processes graphic data. The MCH 113 interfaces data reading and writing between the memory 112 and the other components including the CPU 111. The ICH 114 interfaces communication between the CPU 111 and the device 115.

The device 115 may include, as a variety of hardware, at least one of a keyboard, mouse, tablet, touch screen, joystick, webcam, image scanner, barcode reader, sound card, speaker, microphone, printer, hard disk drive, CD-ROM, DVD-ROM, USB drive, MODEM, network card, and the like.

The display unit 117 displays an image on the basis of graphic data processed by the graphic controller 116. The display unit 117 may be provided as an LCD, OLED or the like.

Referring back to FIG. 1, the battery unit 20 according to the present embodiment may be detachably mounted to the system main body 10. The battery unit 20 is charged by the system main body 10 or supplies electric power to the system main body 10 when the battery unit 20 is mounted to the system main body 10. The battery unit 20 may include at least one battery cell which is chargeable. The battery unit 20 may further include a battery controller 22 which controls the battery cell 21 to be charged or discharged.

The system main body 10 according to the present embodiment further includes a charging unit 12 which charges the battery unit 20. The charging unit 12 is supplied with an adapter voltage Va (see FIG. 3) through an adapter (not shown), and supplies a charging current to the battery unit 20 to perform the charging. The system unit 11 may be supplied with the adapter voltage Va if the adapter voltage Va is in a usable state; and may be supplied with a battery voltage Vb from the battery unit 20 if the adapter voltage Va is in a non-usable state.

Further, the system main body 10 according to the present embodiment includes a first temperature compensating unit 13 which adjusts the level of the charging current so that temperature of at least a part of the charging unit 12 is within a predetermined range. That is, the first temperature compensating unit 13 may selectively maintain the temperature of the charging unit to prevent troubles in a charging control of the charging unit 12 even though heat is generated to the charging unit 12 due to, for example, the charging of the battery unit 20.

Figure 3:
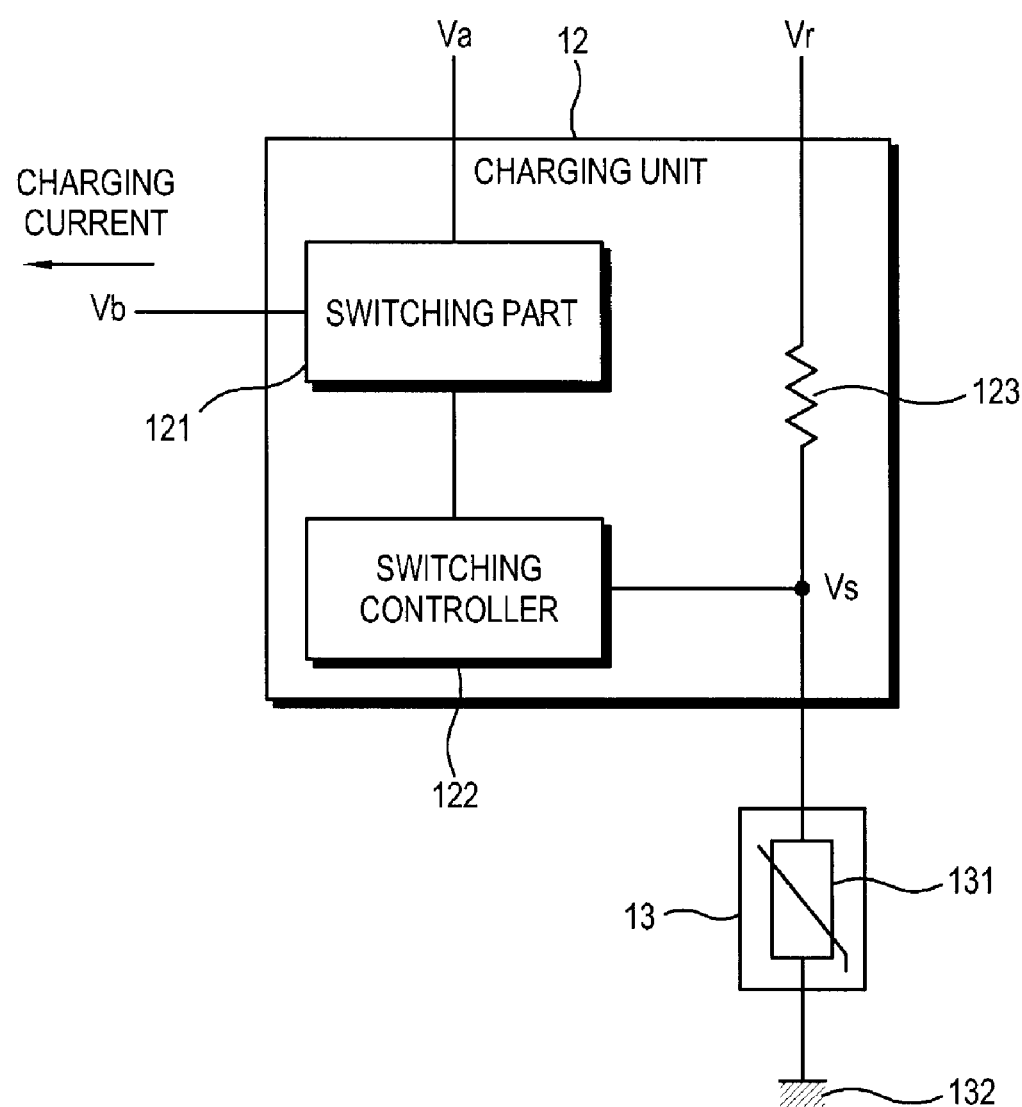
FIG. 3 illustrates a configuration of a charging unit and a first temperature compensating unit according to an exemplary embodiment of the present invention.

FIG. 3 illustrates a configuration of the charging unit 12 and the first temperature compensating unit 13 according to an exemplary embodiment of the present invention. The charging unit 12 includes a switching part 121 which performs switching to output the charging current to the battery unit 20, and a switching controller 122 which controls the switching part 121 so that the battery voltage Vb reaches a predetermined target value. The charging unit 12 may include a so-called DC-DC converter which performs the charging of the battery unit 20 in a switched-mode type. Although not shown, the charging unit 12 may further include a capacitor, an inductor and a diode for the switched-mode DC-DC conversion.

The switching part 121 according to the present embodiment may include an FET. In an alternate embodiment, the switching part 121 and the switching controller 122 may be provided as a single integrated circuit chip. As the switching part 121 becomes arranged closer to the switching controller 122, the switching controller 122 is more significantly affected by the temperature change in the switching part 121. The heat generated in the switching part 121 may affect a control operation of the switching controller 122.

In order to guarantee the reliability of the control operation of the switching controller 122, the first temperature compensating unit 13 prevents the temperature of the switching controller 122 to pass beyond a predetermined range. Since the temperature of the switching controller 122 is affected by the heat generated from the switching part 121, the first temperature compensating unit 13 keeps the switching part 121 from generating heat in order to prevent an increase in the temperature of the switching controller 122.

In the switching part 121 which performs the switched-mode DC-DC conversion, the higher the charging current becomes, the more heat is generated. Thus, the first temperature compensating unit 13 may decrease the charging current to keep the switching part 121 from generating heat that would increase the temperature of the switching controller 122.

On the other hand, the charging current should be adjusted so that the battery voltage Vb reaches the predetermined target value. To this end, if the battery voltage Vb does not reach the target value, the level of the charging current should be maintained at a suitable level or higher. That is, as long as the reliability of the control operation of the switching controller 122 is guaranteed, the level of charging current may be maintained so that the battery voltage Vb can reach the predetermined target value. Note that the charging current is excessively decreased when the temperature of the switching controller 122 is increased slightly, thus unduly lengthening the charging time which is undesirable. By maintaining the level of charging current, the charging current may not be excessively decreased even when the temperature of the switching controller 122 is increased due to the heat from the switching part 121.

Figure 4:
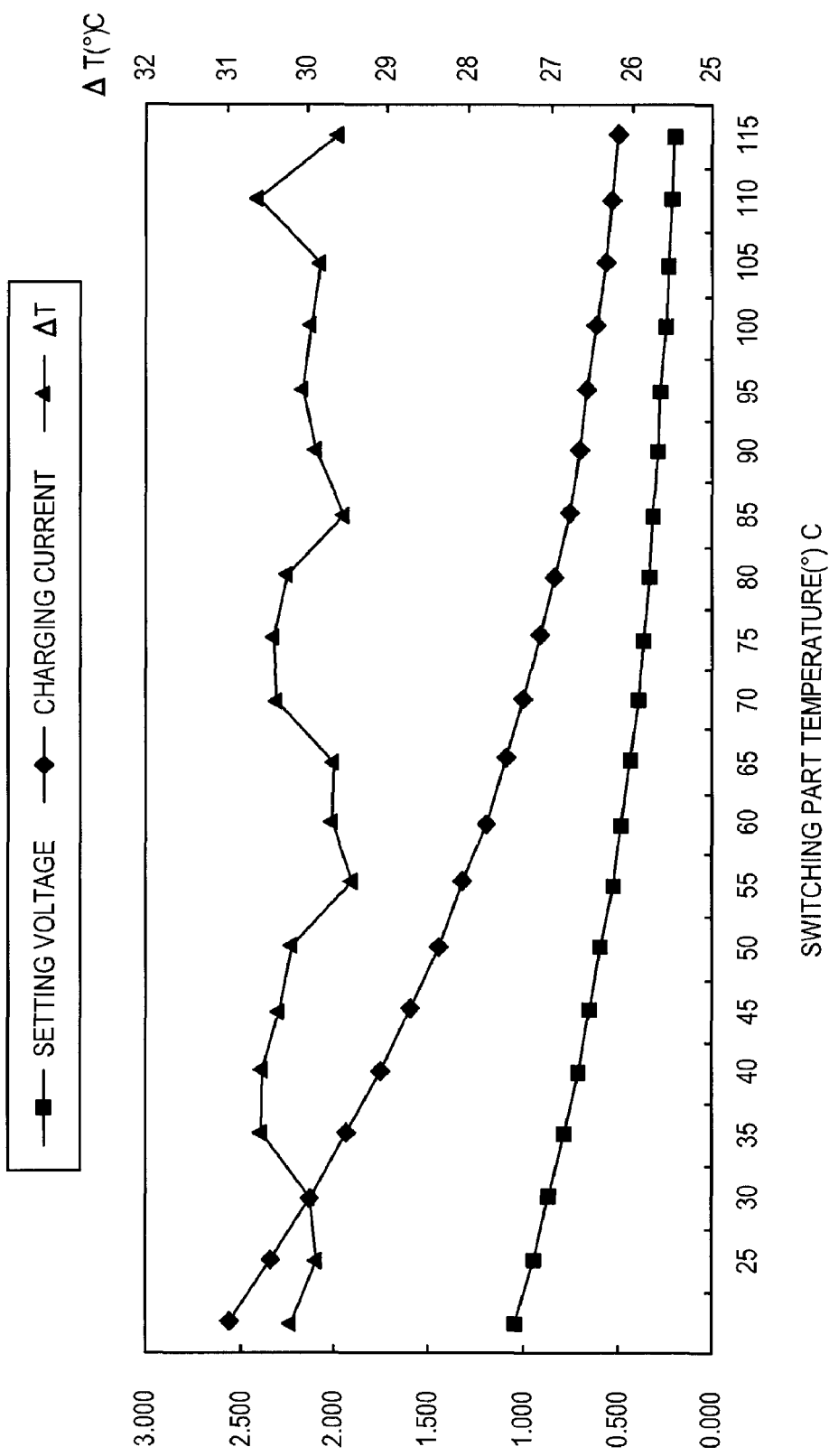
FIG. 4 is a graph illustrating a charging current according to an exemplary embodiment of the present invention.

FIG. 4 is a graph illustrating a charging current according to an exemplary embodiment of the present invention. In FIG. 4, the transverse axis represents the temperature of the switching part 121; the right longitudinal axis represents temperature difference ΔT between the temperature of the switching controller 122 and a normal temperature (about 25 degree Celsius); and the left longitudinal axis represents the level of the charging current.

As shown in FIG. 4, the first temperature compensating unit 13 decreases the level of the charging current if the temperature of the switching part 121 is increased, thereby preventing the switching part 121 from being excessively heated. Contrarily, the first temperature compensating unit 13 increases the level of the charging current if the temperature of the switching part 121 is decreased, thus allowing the battery voltage Vb to reach the target value. Thus, even though the temperature of the switching part 121 is either increased or decreased, the temperature difference ΔT can be maintained such that the variation of the temperature difference ΔT is within a range of about 1 degree Celsius, where a reference temperature difference ΔT is about 30 degree Celsius. Maintaining the temperature difference within this range will guarantee the reliability of the control operation of the switching controller 122.

Referring back to FIG. 3, the first temperature compensating unit 13 includes a thermistor 131 which has a resistance value varying according to the temperature of the switching part 121. As shown in FIG. 3, one terminal of the thermistor 131 is connected to a node at which the voltage determines the charging current (hereinafter, the voltage of the node is referred to as a setting voltage) (see Vs in FIG. 3); and the other terminal of the thermistor 131 may be connected to a ground 132 which substantially contacts the switching part 121.

In FIG. 3, the ground 132 is shown to be spaced from the switching part 121 for the convenience of circuit drawing. It should be noted that the ground 132 is provided in a board on which the charging unit 12 is mounted and the temperature of the switching part 121 can be sensed through the ground 132. In the case where the switching part 121 and the switching controller 122 are provided as a single integrated circuit, the other terminal of the thermistor 131 may be connected to a ground pad of the integrated circuit.

The switching controller 122 determines the level of the charging current on the basis of the setting voltage Vs. As the setting voltage Vs increases, the charging current increases; and as the setting voltage Vs decreases, the charging current decreases. As shown in FIG. 3, the setting voltage Vs is a fraction of a reference voltage Vr which is applied across a reference resistance 123 and the thermistor 131. That is, if the resistance value of the thermistor 131 is high, the setting voltage Vs becomes high; and if the resistance value of the thermistor 131 is low, the setting voltage Vs becomes low.

According to the present embodiment, as temperature of the thermistor 131 increases, the resistance value of the thermistor 131 may be decreased. If the temperature of the thermistor 131 increases due to the heat generated from the switching part 121, the resistance value of the thermistor 131 is decreased. Thus, the setting voltage Vs is decreased and the charging current is decreased. Contrarily, if the temperature of the thermistor 131 is decreased since the heat generated from the switching part 121 decreases, the resistance value of the thermistor 131 is increased. Thus, the setting voltage Vs is increased and the charging current is increased. That is, the thermistor 131 decreases the charging current if the temperature of the switching part 121 is increased in order to prevent the switching part 121 from generating excessive heat; and increases the charging current if the temperature of the switching part 121 is decreased in order to allow the battery voltage Vb to reach the target value.

Figure 5:
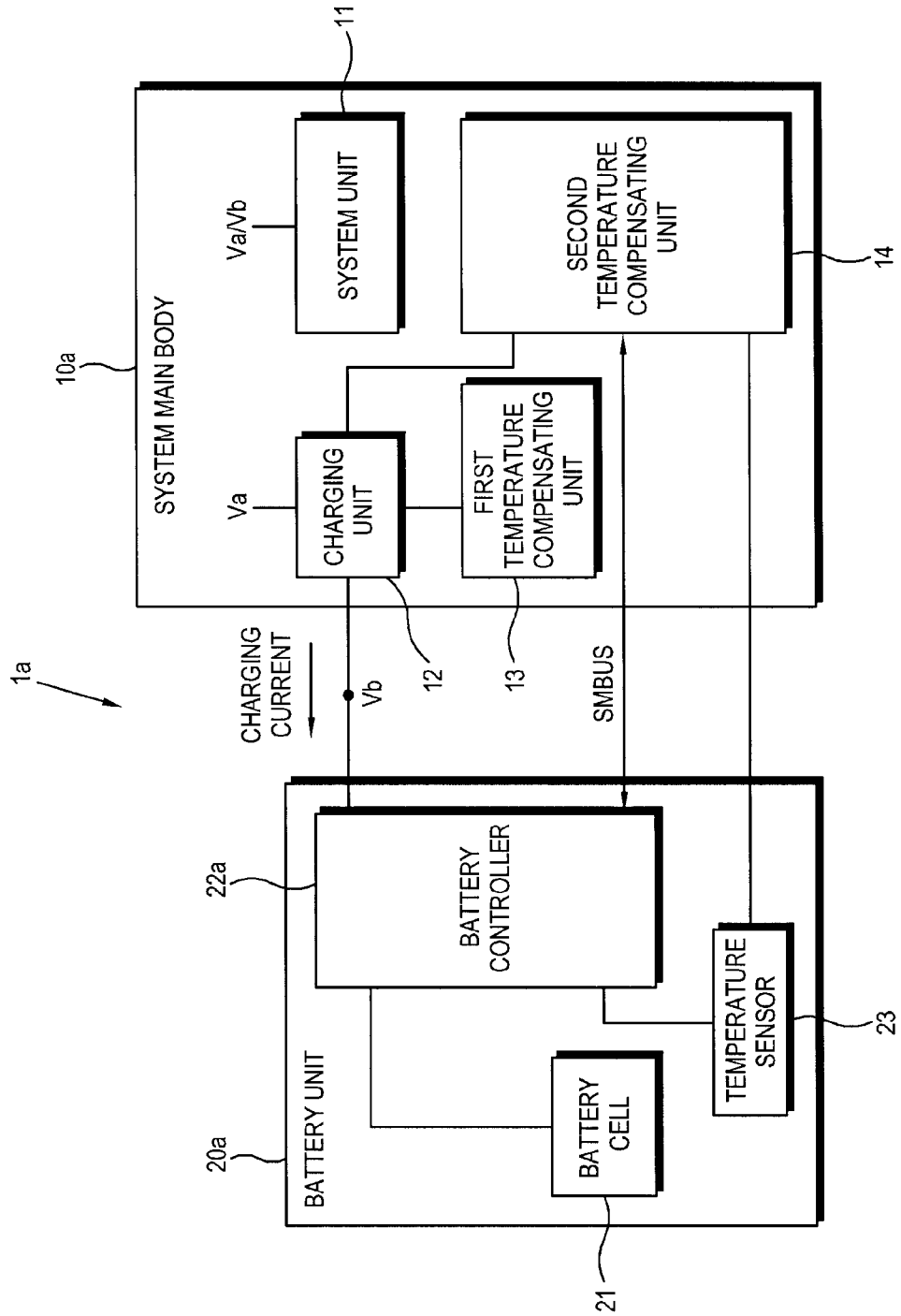
FIG. 5 is a block diagram illustrating a configuration of a computer system according to another exemplary embodiment of the present invention.

FIG. 5 is a block diagram illustrating a configuration of a computer system 1a according to another exemplary embodiment of the present invention. Hereinafter, repetitive description to components like the components of the computer system 1 as described with reference to FIGS. 1 to 4 will be avoided to avoid redundancy.

The computer system 1a according to the present embodiment includes a system main body 10a having a first temperature compensating unit 13 and a second temperature compensating unit 14. The system main body 10a charges a battery unit 20a and receives a battery voltage Vb from the charged battery unit 20a.

The second temperature compensating unit 14 decreases a charging current if temperature of the battery unit 20a is equal to or higher than a first predetermined value. That is, the temperature of the battery unit 20a is likely to increase to affect operations or safety of the computer system 1a. To address this, the second temperature compensating unit 14 decreases the charging current to prevent malfunction or troubles of the computer system 1a in advance. Thus, the reliability of a charging control can be guaranteed against the heat from the charging unit 12 using the first temperature compensating unit 13; and operational reliability and safety of the computer system can be also enhanced against the heat from the battery unit 20a using the second temperature compensating unit 14.

According to the present embodiment, the second temperature compensating unit 14 decreases the charging current by a predetermined level if the temperature of the battery unit 20a is equal to or higher than the first predetermined value. Thereafter, if the temperature of the battery unit 20a is still high, the second temperature compensating unit 14 may stop the charging operation of the charging unit 12.

The battery unit 20a may further include a temperature sensor 23 for sensing the temperature of a battery cell 21. The second temperature compensating unit 14 may check the temperature of the battery unit 20a through the temperature sensor 23. The temperature sensor 23 may include a thermistor. The battery unit 20a includes a battery controller 22a, which may perform data communication using a device such as a System Management Bus (SMBus) with the second temperature compensating unit 14. The battery controller 22a may check the temperature of the battery unit 20a through the temperature sensor 23; and the second temperature compensating unit 14 may check the temperature of the battery unit 20a through the communication with the battery controller 22a.

Figure 6:
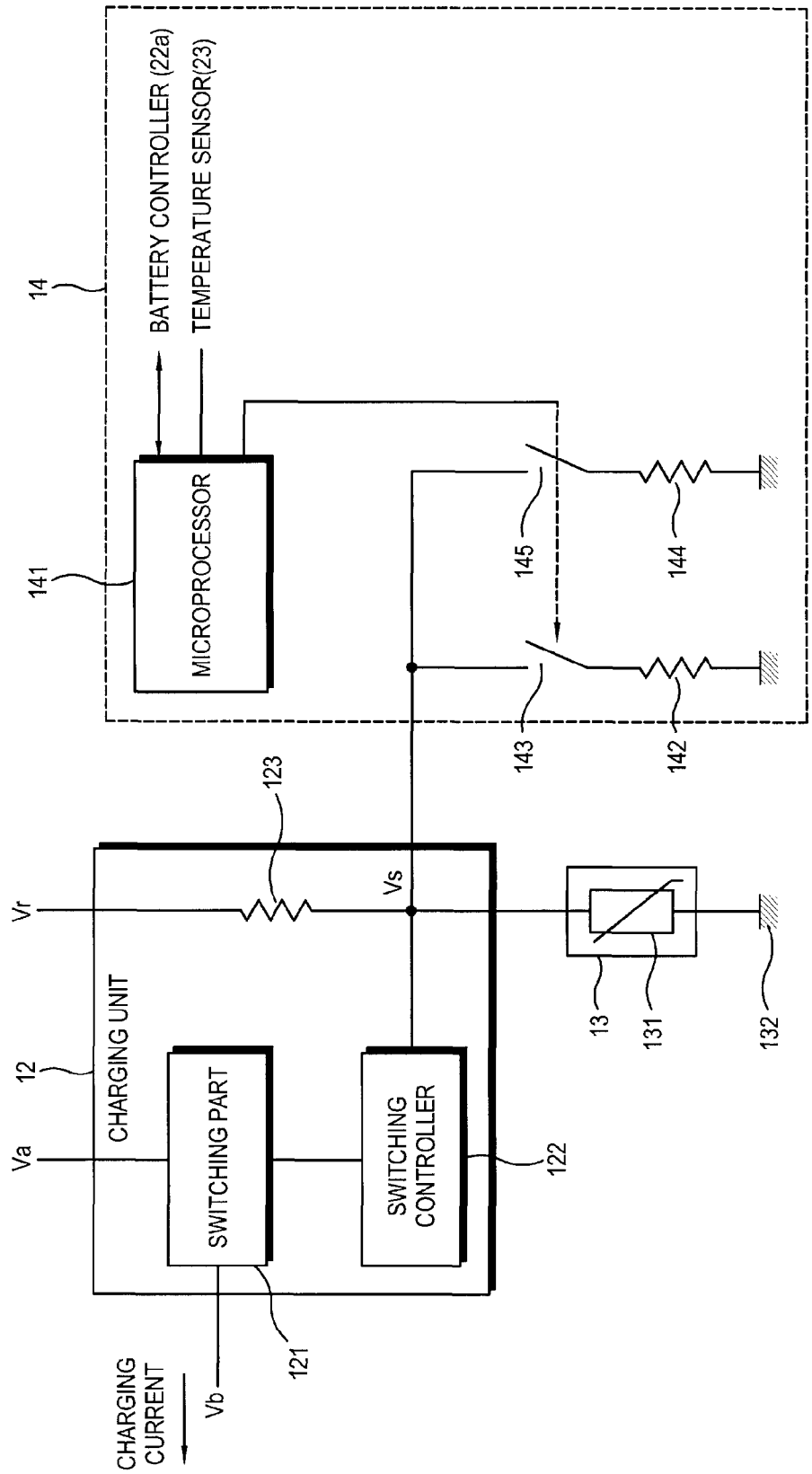
FIG. 6 illustrates a configuration of a second temperature compensating unit of the computer in FIG. 5.

FIG. 6 illustrates a configuration of the second temperature compensating unit 14 of the computer system 1a in FIG. 5. As shown in FIG. 6, the second temperature compensating unit 14 according to present embodiment includes a first resistor 142 and a second resistor 144 connected in parallel to the node Vs; and a first switch 143 and a second switch 145 connected in series with the first and second resistors 142 and 144, respectively. Further, the second temperature compensating unit 14 may include a microprocessor 141 which controls the switching of the first and second switches 143 and 145 according to the temperature of the battery unit 20a.

In the state where the first and second switches 143 and 145 are turned off, the microprocessor 11 checks the temperature of the battery unit 20a through at least one of the battery controller 22a and the temperature sensor 23, and turns on the first switch 143 if the temperature of the battery unit 20a is equal to or higher than the first predetermined value. Thus, a total resistance value is decreased due to the parallel connection of the first resistor 142 to the thermistor 131, and as a result, the setting voltage Vs is decreased and the charging current is decreased. The resistance value of the first resistor 142 may be set according to the predetermined level of the charging current to be primarily decreased.

In the state that the charging current is decreased by the predetermined level, the microprocessor 141 checks the temperature of the battery unit 20a, and turns on the second switch 145 if the temperature of the battery unit 20a is still high. Then, the second resistor 144 is connected in parallel with the thermistor 131. The second resistor 144 has, for example, a resistance value of several ohms which is much small compared with the thermistor 131. Thus, the setting voltage Vs becomes nearly close to zero, and as a result, the charging current does not nearly flow, thereby stopping the charging operation.

Figure 7:
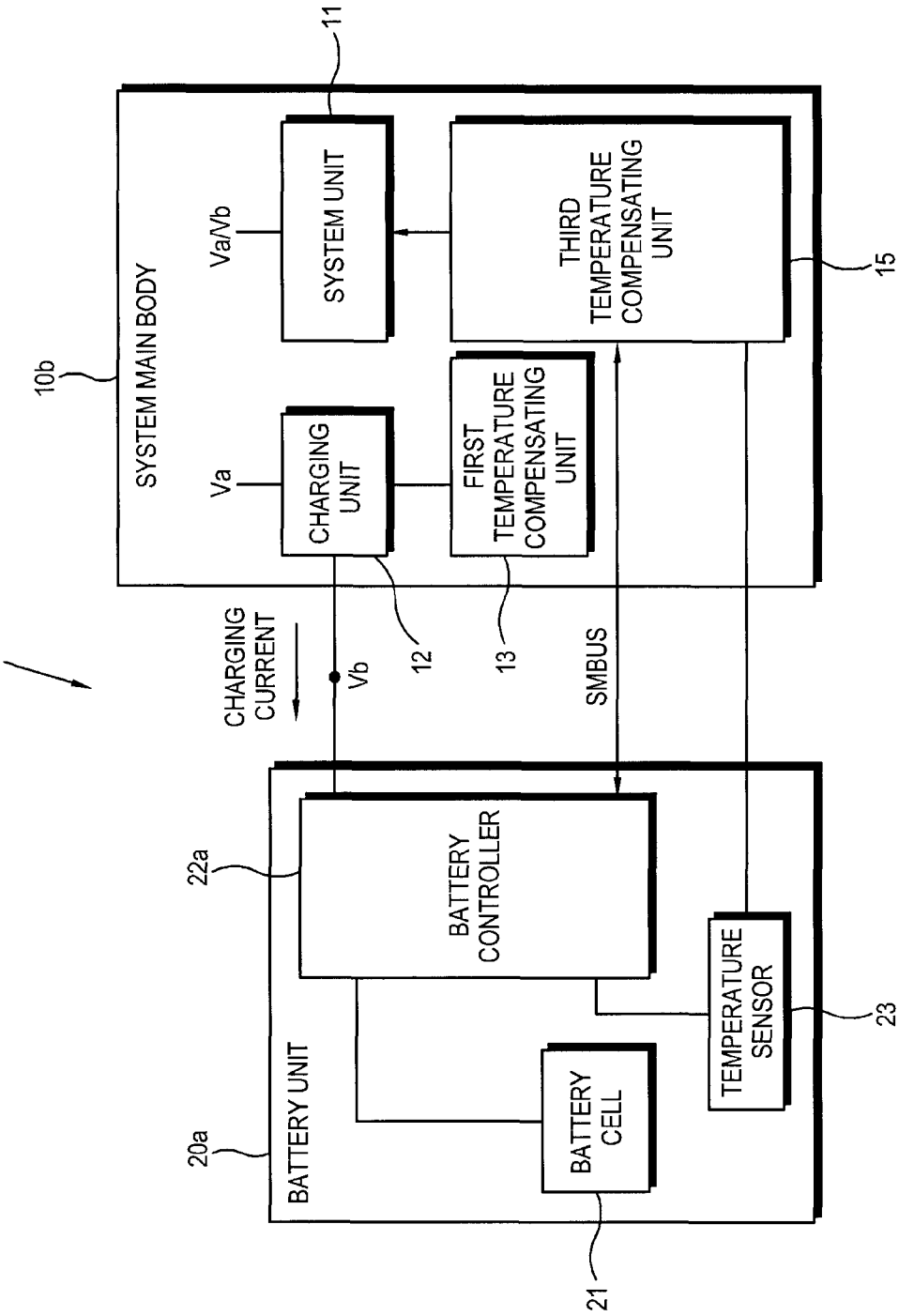
FIG. 7 is a block diagram illustrating a configuration of a computer system according to still another exemplary embodiment of the present invention.

FIG. 7 is a block diagram illustrating a configuration of a computer system 1b according to still another exemplary embodiment of the present invention. Repetitive description to components like the components of the computer systems 1 and 1a as described with reference to FIGS. 1 to 6 will be avoided to avoid redundancy.

The computer system 1b according to the present embodiment includes a system main body 10b which includes a first temperature compensating unit 13 and a third temperature compensating unit 15. The system main body 10b charges a battery unit 20a and receives a battery voltage Vb from the charged battery unit 20a.

The third temperature compensating unit 15 decreases power consumption of a system unit 11 if temperature of the battery unit 20a is equal to or higher than a second predetermined value. That is, in the case where the temperature of the battery unit 20a is likely to increase to affect operations or safety of the computer system 1b, the third temperature compensating unit 15 decreases power consumption of the system unit 11 to prevent malfunction or troubles of the computer system 1b in advance. Thus, the reliability of the charging control can be guaranteed against the heat from the charging unit 12 using the first temperature compensating unit 13; and operational reliability and safety of the system can be enhanced against the heat from the battery unit 20a using the third temperature compensating unit 15.

Figure 8:
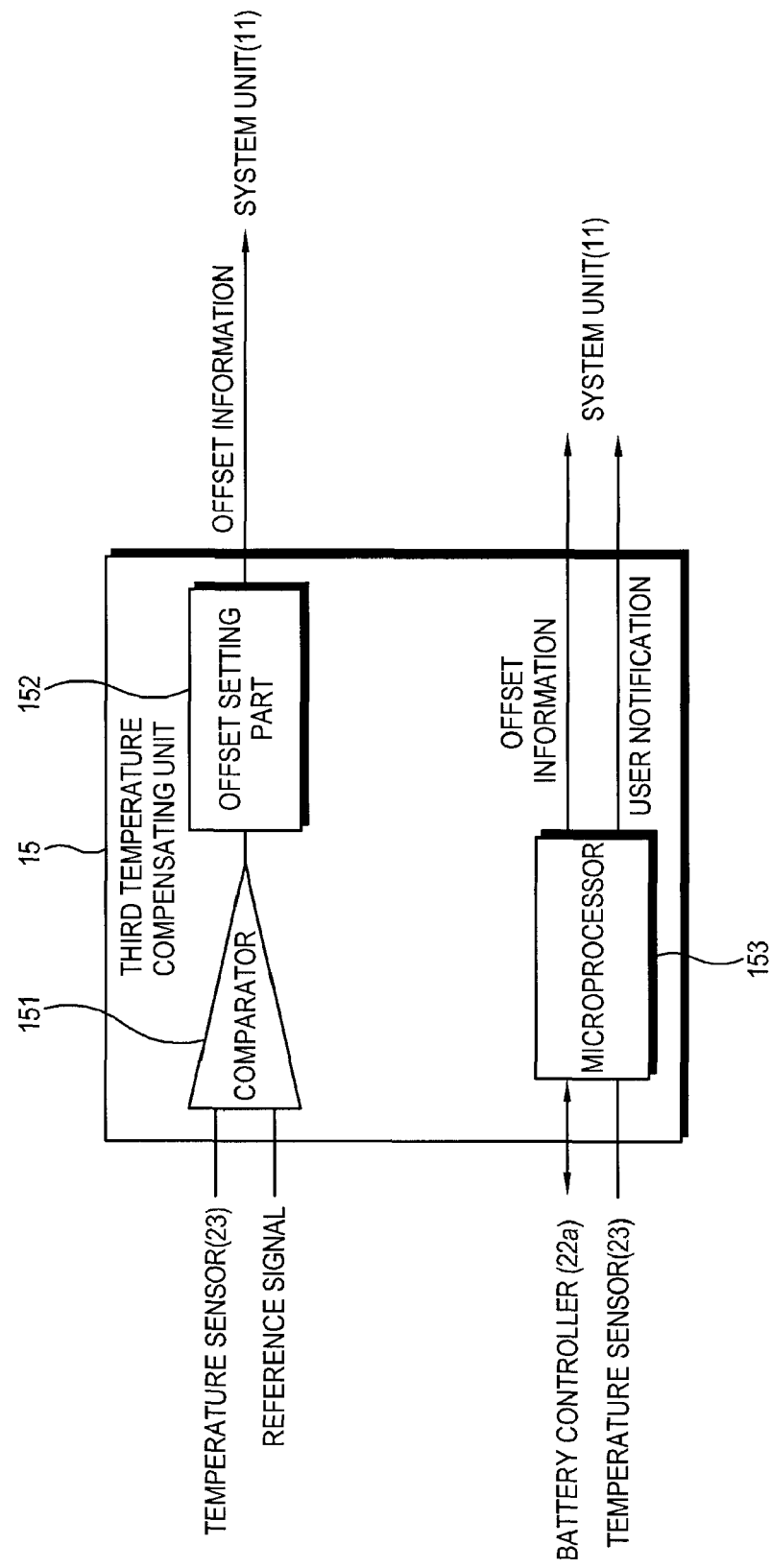
FIG. 8 illustrates a configuration of a third temperature compensating unit of the computer in FIG. 7.

FIG. 8 illustrates a configuration of the third temperature compensating unit 15 of the computer system 1b in FIG. 7. As shown in FIG. 8, the third temperature compensating unit 15 may include a comparator 151 which compares temperature of the battery unit 20a sensed by a temperature sensor 23 with a reference signal corresponding to a second predetermined value; and an offset setting part 152 which offsets a power management threshold value for the system unit 11 as the comparison result of the comparator 151.

The comparator 151 outputs a signal of a predetermined high or low level if the temperature of the battery unit 20a exceeds the second predetermined value. The offset setting part 152 offsets the power management threshold value by a predetermined amount according to the level of the signal outputted from the comparator 151 if the temperature of the battery unit 20a exceeds the predetermined value. In this case, in the system unit 11, a Basic Input Output System (BIOS) confirms that the power management threshold value is offset by the predetermined value from the offset setting part 152, and controls operational frequency of a CPU 111 on the basis of the offset power management threshold value through an OS (Operating System) to decrease an operational speed of the CPU 111. Thus, the power consumption of the system unit 11 can be decreased.

Further, the third temperature compensating unit 15 may include a microprocessor 153 which confirms the temperature of the battery unit 20a through a battery controller 22a and directly offsets the power management threshold value for the system unit 11.

According to an alternative embodiment, the second and third temperature compensating units 14 and 15 may notify a user of a temperature state of the computer system 1a or 1b, respectively, if the temperature of the battery unit 20a is high. For example, the temperature state of the computer system 1a or 1b may be notified to the user through an LED or the like.

According to yet another exemplary embodiment of the present invention, a computer system may include a first temperature compensating unit 12, a second temperature compensating unit 14, and a third temperature compensating unit 15.

Figure 9:
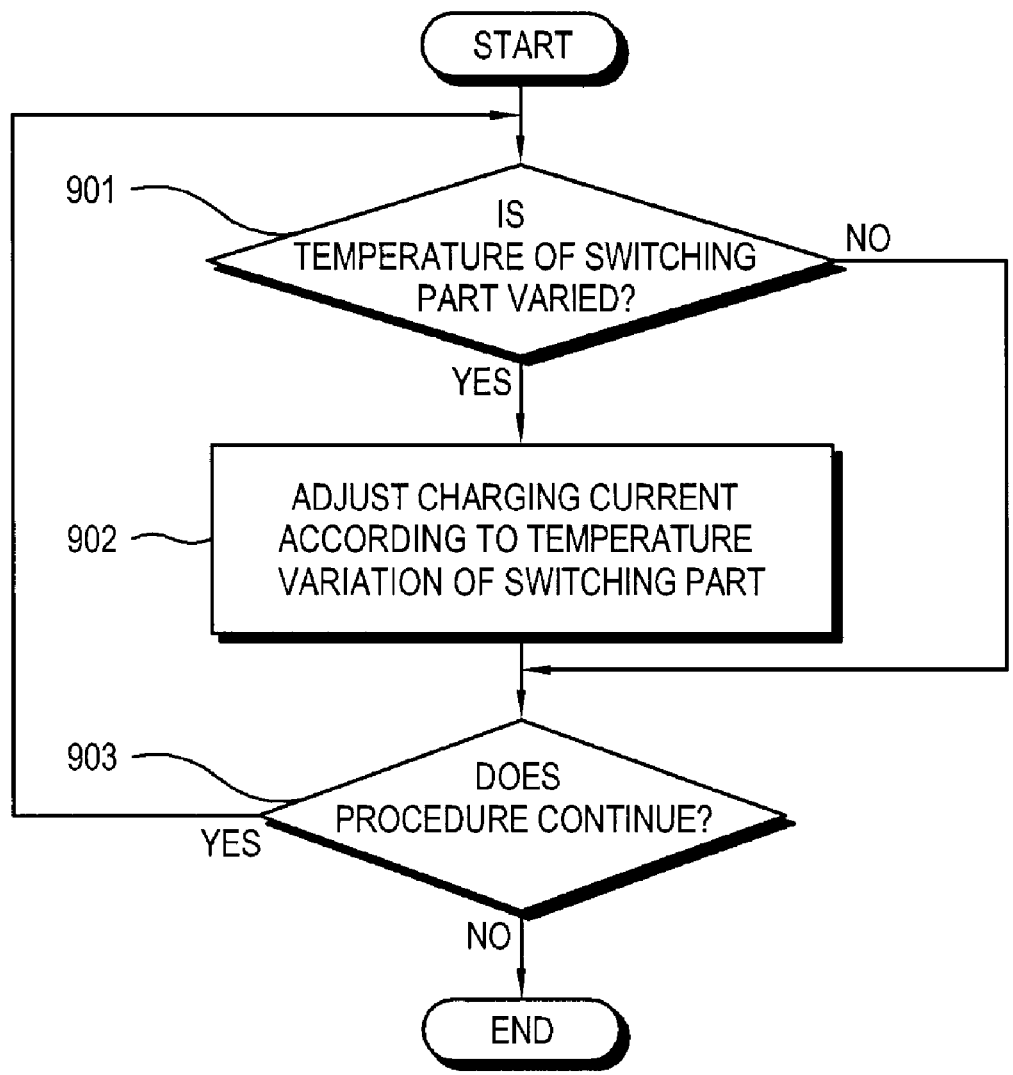
FIG. 9 is a flowchart for illustrating a control method of a computer system according to an exemplary embodiment of the present invention.

FIG. 9 is a flowchart for illustrating a control method of a computer system according to an exemplary embodiment of the present invention.

Firstly, it is determined whether temperature of the switching part 121 is varied (901). If it is determined that the temperature of the switching part 121 is varied, the charging current is adjusted according to the temperature variation of the switching part 121 to guarantee reliability of a control operation of the switching controller 122 (902). That is, if the temperature of the switching part 121 is increased, the charging current is selectively decreased; and if the temperature of the switching part 121 is decreased, the charging current is increased.

If it is determined that the temperature of the switching part 121 is not varied, or after operation 902, it is confirmed whether the procedure continues (903). If it is confirmed that the procedure continues, operations 901 and 902 are repeated. If not, the procedure terminates.

Figure 10:
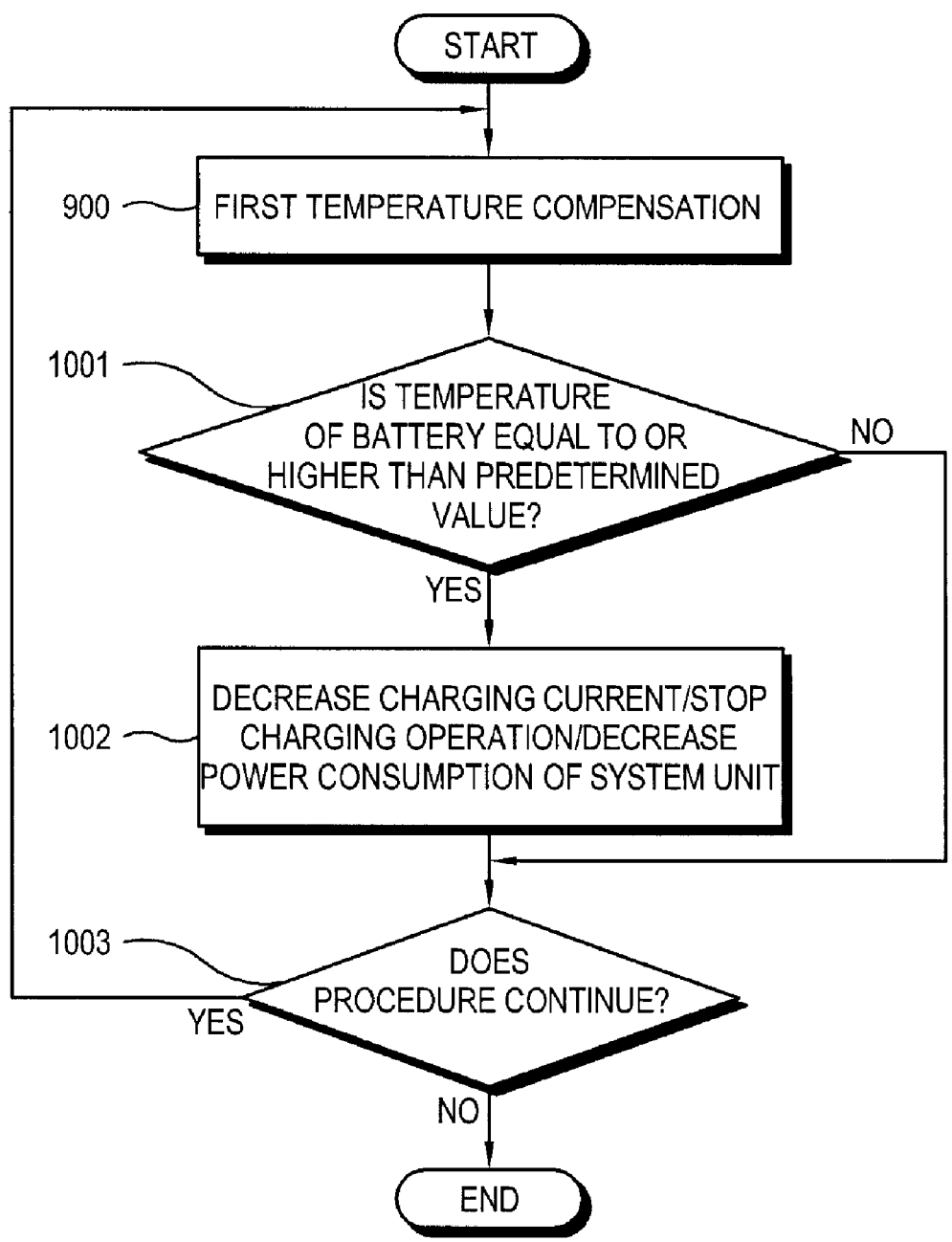
FIG. 10 is a flowchart for illustrating a control method of a computer system according to another exemplary embodiment of the present invention.

FIG. 10 is a flowchart for illustrating a control method of a computer system according to another exemplary embodiment of the present invention.

Firstly, first temperature compensation is performed (900). Note that the first temperature compensation according to the present embodiment is the same as operations as described with reference to FIG. 9.

Then, it is determined whether the temperature of the battery unit 20*a* is equal to or higher than a predetermined value (1001). If it is determined that the temperature is equal to or higher than the predetermined value, at least one of a second temperature compensation and a third temperature compensation is performed, thus guaranteeing operational reliability and safety of the computer system 1*a* or 1*b* (1002). The second temperature compensation may be performed to decrease the charging current or to stop the charging operation; and the third temperature compensation may be performed to decrease power consumption of the system unit 11.

If it is determined in operation 1001 that the temperature of the battery unit 20*a* is lower than the predetermined value, or after operation 1002, it is confirmed whether the procedure continues (1003). If it is confirmed that the procedure continues, operations 900, 1001 and 1002 are repeated; and if not, the procedure terminates.

In the above description, the first temperature compensation is performed prior to operations 1001, 1002 and 1003, but may be performed between operations 1001, 1002 and 1003, or after operation 1003.

The above-described methods according to the present invention can be realized in hardware or as software or computer code that can be stored in a recording medium such as a CD ROM, a RAM, a floppy disk, a hard disk, thumbnail drive, memory stick, memory card, etc., or a magneto-optical disk or downloaded over a network, so that the methods described herein can be executed by such software using a general purpose computer, or a special processor or microprocessor or in programmable or dedicated hardware, such as an ASIC or FPGA. As would be understood in the art, the computer, the processor or the programmable hardware include memory components, e.g., RAM, ROM, Flash, etc. that may store or receive software or computer code that when accessed and executed by the computer, processor or hardware implement the processing methods described herein.

Although a few exemplary embodiments of the present invention have been shown and described, it will be appreciated by those skilled in the art that changes may be made in these embodiments without departing from the principles and spirit of the invention, the scope of which is defined in the appended claims and their equivalents.

What is claimed is:

1. A computer system comprising:
   a battery unit;
   a charging unit which outputs a charging current to the battery unit; and
   a first temperature compensating unit which selectively adjusts the level of the charging current so that the temperature of the charging unit is substantially within a predetermined range, wherein the charging unit comprises: a switching part electrically coupled to the battery unit; and
   a switching controller which controls the switching part so that a voltage of the battery unit reaches a predetermined target value.

2. The computer system according to claim 1, wherein the first temperature compensating unit comprises a thermistor which is varied in a resistance value thereof according to the temperature of the switching part.

3. The computer system according to claim 1, further comprising: a second temperature compensating unit which decreases the charging current by a predetermined amount if temperature of the battery unit is equal to or higher than a first predetermined value.

4. The computer system according to claim 3, wherein the second temperature compensating unit stops the output of the charging current after the charging current is decreased.

5. The computer system according to claim 3, wherein the second temperature compensating unit comprises: a resistor; a switch connected in series with the resistor; and a microprocessor which turns on the switch if the temperature of the battery unit is equal to or higher than the first predetermined value.

6. The computer system according to claim 1, further comprising: a system unit and a third temperature compensating unit which decreases power consumption of the system unit if temperature of the battery unit is equal to or higher than a second predetermined value.

7. The computer system according to claim 6, wherein the third temperature compensating unit comprises: a comparator which compares the temperature of the battery unit with the second predetermined value; and an offset setting part which offsets a power management threshold value for the system unit on the basis of the comparison result of the comparator.

8. The computer system according to claim 6, wherein the third temperature compensating unit comprises: a microprocessor which receives a signal indicating the temperature of the battery unit and offsets the power management threshold value for the system unit.

9. A method for controlling power in a computer system, comprising:
   outputting a charging current to a battery unit for supplying electric power to a system unit; and
   adjusting the level of the charging current so that the temperature of the charging unit is substantially maintained within a predetermined range, wherein the outputting comprises imposing a predetermined limit on a flow of charging current so that a voltage of the battery unit reaches a predetermined target value.

10. The control method according to claim 9, further comprising: decreasing the charging current if temperature of the battery unit is equal to or higher than a first predetermined value.

11. The control method according to claim 10, wherein the decreasing comprises stopping the output of the charging current after the decreasing the charging current.

12. The control method according to claim 9, further comprising decreasing power consumption of the system unit if temperature of the battery unit is equal to or higher than a second predetermined value.

13. The control method according to claim 12, wherein the decreasing comprises offsetting a power management threshold value for the system unit by a predetermined amount if the temperature of the battery unit is equal to or higher than the second predetermined value.

14. A non-transitory storage medium comprising memory containing executable instructions such that when processed by one or more processors causes at least one processor to:
control a flow of charging current from a charging unit to a battery unit, by selectively adjusting the level of the charging current so that the temperature of the charging unit is substantially maintained within a predetermined range, wherein the processor further: decrease the charging current by a predetermined amount if temperature of the battery unit is equal to or higher than a first predetermined value.

15. The non-transitory storage medium according to claim 14, wherein the processor further: halt the flow of the charging current after decreasing the charging current.

16. The non-transitory storage medium according to claim 14, wherein the processor further: decrease power consumption of a system unit if temperature of the battery unit is equal to or higher than a second predetermined value.

17. The non-transitory storage medium according to claim 16, wherein the processor further: offset a power management threshold value for the system unit by a predetermined amount if the temperature of the battery unit is equal to or higher than the second predetermined value.

18. A computer system comprising:
a battery unit;
a charging unit which outputs a charging current to the battery unit, wherein the charging unit includes a switching part electrically coupled to the battery unit;
a first temperature compensating unit which selectively adjusts the level of the charging current so that the temperature of the charging unit is substantially within a predetermined range;
a second temperature compensating unit which decreases the charging current by a predetermined amount if temperature of the battery unit is equal to or higher than a first predetermined value; and
a system unit; and
a third temperature compensating unit which decreases power consumption of the system unit if temperature of the battery unit is equal to or higher than a second predetermined value.

19. The computer system according to claim 18, wherein the switching part includes a switching controller which controls the switching part so that a voltage of the battery unit reaches a predetermined target value.

20. The computer system according to claim 18, wherein the first temperature compensating unit comprises a thermistor which is varied in a resistance value thereof according to the temperature of the switching part.

21. The computer system according to claim 18, wherein the second temperature compensating unit stops the output of the charging current after the charging current is decreased.

22. The computer system according to claim 18, wherein the second temperature compensating unit comprises: a resistor; a switch connected in series with the resistor; and a microprocessor which turns on the switch if the temperature of the battery unit is equal to or higher than the first predetermined value.

23. The computer system according to claim 18, wherein the third temperature compensating unit comprises: a comparator which compares the temperature of the battery unit with the second predetermined value; and an offset setting part which offsets a power management threshold value for the system unit on the basis of the comparison result of the comparator.

24. The computer system according to claim 18, wherein the third temperature compensating unit comprises: a microprocessor which receives a signal indicating the temperature of the battery unit and offsets the power management threshold value for the system unit.

25. A method for controlling power in a computer system, comprising:
outputting a charging current from a charging unit to a battery unit for supplying electric power to a system unit, wherein the charging unit includes a switching part electrically coupled to the battery unit;
adjusting the level of the charging current so that the temperature of a first or a second temperature compensating unit of the charging unit is substantially maintained within a predetermined range; and
decreasing power consumption of the system unit if the temperature of a third temperature compensating unit is equal to or higher than a second predetermined value.

26. The control method according to claim 24, wherein the outputting comprises imposing a predetermined limit on a flow of charging current so that a voltage of the battery unit reaches a predetermined target value.

27. control method according to claim 24, wherein the second temperature compensating unit is a charging current temperature sensor of the battery unit.

28. The control method according to claim 24, wherein the decreasing comprises stopping the output of the charging current after the decreasing the charging current.

29. The control method according to claim 24, wherein the third temperature compensating unit is a power consumption temperature sensor of the battery unit.

30. The control method according to claim 28, wherein the decreasing comprises offsetting a power management threshold value for the system unit by a predetermined amount if the temperature of the battery unit is equal to or higher than the second predetermined value.

31. A non-transitory storage medium comprising memory containing executable instructions such that when processed by one or more processors causes at least one processor to:
control a flow of charging current from a charging unit to a battery unit, by using a switching part electrically coupled to the battery unit and selectively adjusting the level of the charging current so that the temperature of the charging unit is substantially maintained within a predetermined range;
decrease the charging current by a predetermined amount if temperature of the battery unit is equal to or higher than a first predetermined value; and
decrease power consumption of a system unit if temperature of the battery unit is equal to or higher than a second predetermined value.

32. The non-transitory storage medium according to claim 30, wherein the processor further: halt the flow of the charging current after decreasing the charging current.

33. The non-transitory storage medium according to claim 30, wherein the processor further: offset a power management threshold value for the system unit by a predetermined amount if the temperature of the battery unit is equal to or higher than the second predetermined value.

* * * * *

UNITED STATES PATENT AND TRADEMARK OFFICE
CERTIFICATE OF CORRECTION

PATENT NO.       : 8,384,357 B2
APPLICATION NO.  : 12/789517
DATED            : February 26, 2013
INVENTOR(S)      : Jeong-gyu Park It is certified that error appears in the above-identified patent and that said Letters Patent is hereby corrected as shown below:

In the Claims

Column 10, Claim 11, Line 65 should read as follows:
--...current after decreasing the charging...--

Column 12, Claim 26, Line 26 should read as follows:
--...according to claim 25, wherein...--

Column 12, Claim 27, Line 30 should read as follows:
--...The control method...--

Column 12, Claim 27, Line 30 should read as follows:
--...according to claim 25, wherein...--

Column 12, Claim 28, Line 33 should read as follows:
--...according to claim 25, wherein...--

Column 12, Claim 28, Line 35 should read as follows:
--...current after decreasing the charging...--

Column 12, Claim 29, Line 36 should read as follows:
--...according to claim 25, wherein...--

Column 12, Claim 32, Lines 59-60 should read as follows:
--...according to claim 31, wherein...--

Column 12, Claim 33, Lines 62-63 should read as follows:
--...according to claim 31, wherein...--

Signed and Sealed this
Thirty-first Day of December, 2013

Margaret A. Focarino
*Commissioner for Patents of the United States Patent and Trademark Office*